(12) United States Patent
Kaspar et al.

(10) Patent No.: US 12,280,500 B2
(45) Date of Patent: Apr. 22, 2025

(54) ROBOT PROCESS

(71) Applicant: KUKA Deutschland GmbH, Augsburg (DE)

(72) Inventors: Manuel Kaspar, Königsbrunn (DE); Jonas Schwinn, Augsburg (DE)

(73) Assignee: KUKA Deutschland GmbH (DE)

( * ) Notice: Subject to any disclaimer, the term of this patent is extended or adjusted under 35 U.S.C. 154(b) by 220 days.

(21) Appl. No.: 17/917,645

(22) PCT Filed: Mar. 24, 2021

(86) PCT No.: PCT/EP2021/057572
§ 371 (c)(1),
(2) Date: Oct. 7, 2022

(87) PCT Pub. No.: WO2021/204544
PCT Pub. Date: Oct. 14, 2021

(65) Prior Publication Data
US 2023/0141359 A1    May 11, 2023

(30) Foreign Application Priority Data

Apr. 8, 2020   (DE) .................... 10 2020 204 551.8

(51) Int. Cl.
*B25J 9/16*   (2006.01)
(52) U.S. Cl.
CPC .............. *B25J 9/163* (2013.01); *B25J 9/161* (2013.01)
(58) Field of Classification Search
CPC ................................. B25J 9/163; B25J 9/161
See application file for complete search history.

(56) References Cited

U.S. PATENT DOCUMENTS

| | | | | |
|---|---|---|---|---|
| 2016/0059412 | A1* | 3/2016 | Oleynik | B25J 19/02 |
| | | | | 700/250 |
| 2017/0140259 | A1* | 5/2017 | Bergstra | G06N 3/044 |
| 2018/0281180 | A1* | 10/2018 | Yamamoto | B25J 9/163 |
| 2018/0364265 | A1* | 12/2018 | Schwoebel | G01N 35/00722 |
| 2019/0314996 | A1* | 10/2019 | Otsuki | G06N 3/04 |

(Continued)

FOREIGN PATENT DOCUMENTS

DE    102009027517 A1    1/2011

OTHER PUBLICATIONS

European Patent Office; Search Report in related International Patent Application No. PCT/EP2021/057572 dated Jul. 5, 2021; 2 pages.

*Primary Examiner* — Adam R Mott
*Assistant Examiner* — Matthew C Gammon
(74) *Attorney, Agent, or Firm* — Dorton & Willis, LLP

(57) ABSTRACT

A method for executing a process, in particular using at least one robot, includes executing a run-through of the process, detecting a value of a first process variable, and detecting an assessment of this executed process run-through. Assessment learning steps are then repeated multiple times, wherein run-throughs of the process using varied process controls are executed and additional assessments are detected. A first quality factor model of the process, which model determines a quality factor for the process on the basis on the first process variable, is machine-learned based on the detected assessments and values of the first process variable. The method further includes repeating process control optimization steps multiple times.

17 Claims, 1 Drawing Sheet

(56) References Cited

U.S. PATENT DOCUMENTS

2019/0375112 A1\* 12/2019 Mariyama .............. B25J 13/085
2020/0223065 A1\* 7/2020 Hane ...................... B25J 9/1674
2020/0278657 A1\* 9/2020 Putman .............. G06Q 10/0633

\* cited by examiner

ROBOT PROCESS

CROSS-REFERENCE TO RELATED APPLICATIONS

This application is a national phase application under 35 U.S.C. § 371 of International Patent Application No. PCT/EP2021/057572, filed Mar. 24, 2021 (pending), which claims the benefit of priority to German Patent Application No. DE 10 2020 204 551.8, filed Apr. 8, 2020, the disclosures of which are incorporated by reference herein in their entirety.

TECHNICAL FIELD

The present invention relates to a method, system and computer program product for executing a process, in particular using at least one robot.

BACKGROUND

It is known from internal practice to optimize robot processes, for example regulation parameters, by means of optimizers which optimize a quality criterion, for example minimize a cost function or the like.

While the optimization, in particular convergence and found (local) optima, depends very strongly on the quality criterion, it is often difficult in practice to formulate suitable, in particular sensorily ascertainable, quality criteria, for example in the case of robot-assisted clipping in of snappers or the like: in this way, a person can easily evaluate whether a robot-assisted plug-in or snap(-in) process was successful, while this cannot be easily read out on the basis of force angle courses or joint angle courses of the robot.

SUMMARY

The object of the present invention is to improve the execution of a process, in particular of a robot-assisted process.

This object is achieved by a method and a system or computer program product for executing a method as described herein.

According to one embodiment of the present invention, a method for executing a process, in one embodiment using, in particular by means of, at least one robot, comprises the steps of:

executing a run-through of the process by means of a process control, in one embodiment by means of a process control of the robot;

detecting a (one-dimensional or multidimensional) value of a one-dimensional or multi-dimensional first process variable for this, in particular during this, execution; and detecting an assessment of this executed process run-through.

After the process with the initial process control, which in one embodiment a default process, in particular a standard process control or even already, in particular empirically, can be pre-optimized, is executed, and/or values of the first process variable and, in one embodiment after this process run-through, an assessment of this executed (output) process run-through, in one embodiment an assessment by a person, have been detected, the following assessment learning steps are repeated multiple times according to one embodiment of the present invention:

varying the in particular previous or former process control, in one embodiment of one or more parameters of the process control, in a development of a regulator, by means of an optimizer, in particular a preferably numerical optimization method or means, in particular optimization algorithm, to form a varied process control on the basis of values of a quality criterion for executed process run-throughs;

executing a (further) run-through of the process by means of this varied process control;

detecting a value of the first process variable for this, in particular during this, execution; and detecting an assessment of this executed process run-through, in one embodiment analogous to the assessment for the or in the initial process control;

in particular also varying the initial process control by means of the optimizer to form a varied process control on the basis of values of the quality criterion for the executed output process run-through, executing a re-run-through of the process by means of this varied process control, detecting a value of the first process variable for this, in particular during this, repeated execution detecting an assessment of this executed process run-through;

and multiple times further varying the previous process control, which has in particular already been varied once or multiple times, by means of the optimizer to form a varied process control on the basis of values of the quality criterion for previously executed process run-throughs, executing a further run-through of the process by means of this varied process control, detecting a value of the first process variable for this, in particular during this, further execution, and detecting an assessment of this executed process run-through;

wherein a first quality factor model of the process, which model determines a quality factor of the process on the basis of (a value) of the first process variable, is machine-learned on the basis of these detected assessments and values of the first process variable.

One embodiment is based on the concept of using at least one machine learning method for the assessment of process run-throughs. As a result, complex and/or changing processes can also be advantageously optimized in one embodiment, in particular if a process success can be measured directly only with difficulty. As explained in the introduction, for example during robot-assisted clipping in of snappers or the like, a human, an image and/or an audio processing device can very easily evaluate whether a robot-assisted plug-in or snap(-in) process was successful, in particular by means of a visual evaluation of the joining result by means of the person, image processing of the joining result by means of image processing, in particular detection of a snapping(-in) sound by means of an audio processing device, while this cannot be readily read out on the basis of force angle courses or joint angle courses of the robot.

Accordingly, according to one embodiment of the present invention, the method comprises the process control optimization steps which have been repeated multiple times, after this assessment learning phase/these assessment learning steps:

varying the process control by means of the optimizer to form a changed process control on the basis of values of the quality criterion for executed process run-throughs;

executing a run-through of the process with this changed process control; and detecting a value of the first process variable for this, in particular during this, execution;

wherein the value of the quality criterion for one or more of the process run-throughs that have been executed with one of the changed process controls is determined (in each case) on the basis of a quality factor which, in turn, is determined by the machine-learned first quality factor model on the basis of the value of the first process variable, which value was detected for or during the relevant process run-through.

Thus, in one embodiment, an optimization of the process by means of an optimizer is combined with the evaluation of the process (success) by means of a machine learning method. A quality factor of the process is a success of the process or a different factor or component of the quality criterion in one embodiment. Accordingly, an assessment of a process run-through in one embodiment comprises a value (indication) for this quality factor or the detection of an assessment of an executed process run-through for detecting a value of this quality factor for this executed process run-through. In one embodiment, the quality criterion is a cost function (to be minimized) of the optimizer.

In one embodiment, the value of the quality criterion for one or more process run-through(s) executed with one (of the) varied process control(s) in one (of the) assessment learning step(s) is determined (in each case) on the basis of the detected assessment of this process run-through, in one embodiment the value of the quality criterion is determined in the same way as in the process control optimization step(s), wherein instead of the quality factor determined by the quality factor model (still in one embodiment only) the detected assessment is used.

As a result, in one embodiment, the optimization, in particular a convergence, can be improved, in particular a stability can be increased, and/or a required time and/or run-through number can be reduced, and/or the practicability of the found optimum or the optimized process, in particular robot control, can be improved.

In one embodiment, the method comprises the step of:

detecting (one-dimensional or multi-dimensional) values of an additional or second one-dimensional or multi-dimensional process variable for the, in particular during the, execution of process run-throughs in assessment learning steps and/or in process control optimization steps.

In a further development, the value of the quality criterion for one or more process run-throughs executed with one (of the) varied process control(s) in one (of the) assessment learning step(s) is determined (in each case) on the basis also of the value of the second process variable, which value is detected for this, in particular during this, process run-through, or the value of the quality criterion is additionally dependent on the value of the second process variable, which value is detected for this, in particular during this, process run-through, wherein the detected assessment of this process run-through is independent from this value of the second process variable.

Additionally or alternatively, in one development, the value of the quality criterion for one or more process run-throughs executed with one (of the) changed process control(s) in one (of the) process control optimization step(s) is determined (in each case) on the basis also of the value of the second process variable, which value is determined for this, in particular during this, process run-through, or the value of the quality criterion is additionally dependent on the value of the second process variable, which value is detected for this, in particular during this, process run-through, in one embodiment, in the same way as in the assessment learning step(s), wherein the quality factor determined by the first quality factor model is independent from this value of the second process variable.

Thus, in one embodiment, in addition to the detected assessment or the quality factor determined by the quality factor model, a further or second one-dimensional or multidimensional variable, for example the process duration or the like, is taken into account when determining the (value of the) quality criterion or in the optimization.

As a result, in one embodiment, the optimization, in particular a convergence, can be improved, in particular a stability can be increased, and/or a required time and/or run-through number can be reduced, and/or the practicability of the found optimum or the optimized process, in particular robot control, can be improved.

In one embodiment, for one or more (of the) process run-throughs executed with one (of the) changed process control(s) in one (of the) process control optimization step(s), (in each case) an assessment of this process run-through is detected, in one embodiment in the same way as in the assessment learning step(s), and in one embodiment compared with a quality factor determined by the machine-learned first quality factor model on the basis of the value of the first process variable, which value is detected for this, in particular during this, process run-through.

In a further development, the first quality factor model is further machine-learned on the basis of this value of the first process variable and of this detected assessment.

In other words, machine learning is also further machine-learned during the (further) optimization of the process control in the process control optimization phase or optimization steps. This can then be in particular expedient or advantageous if the process control in the optimization phase changes significantly, for example, in the case of a joining process, an additional movement is established, so that the first process variable, for example joint coordinate profiles or force profiles, changes correspondingly greatly.

Additionally or alternatively, in one development, a message which is optical and/or acoustic in one embodiment is output in one embodiment on the robot, for example by means of a robot-fixed lamp or the like, if, in particular as long as, a tolerance variable which is dependent on a deviation between the detected assessment and the determined quality factor is outside a predetermined tolerance range.

As a result, the further machine learning can advantageously continue as long as necessary during the (further) optimization of the process control in the process control optimization phase or steps.

Additionally or alternatively, in one development, the detection of an assessment of a further process run-through executed with a changed process control in a process control optimization step is executed on the basis of the result of this comparison or depends on the result of this comparison.

In one embodiment, the first quality factor model is machine-learned further if, in particular as long as, a quality factor determined by the first quality factor model deviates too much from the detected assessment, or a tolerance variable which is dependent on this deviation is outside a predetermined tolerance range. Additionally or alternatively, a distance of a further comparison, which distance is temporal in one embodiment, can be increased or a further comparison can be omitted if a quality factor determined by the first quality factor model matches exactly enough with the detected assessment or a tolerance variable which is dependent on this deviation is within a predetermined tolerance range.

As a result, in one embodiment, the optimization, in particular a convergence, can be improved, in particular a stability can be increased, and/or a required time and/or run-through number can be reduced, and/or the practicability of the found optimum or the optimized process, in particular robot control, can be improved.

In one embodiment, at least one further quality factor model of the process is machine-learned on the basis of assessments and values of the first process variable that are detected for or in assessment learning steps(s), which quality factor model determines a quality factor of the process (also) on the basis (of values) of the first process variable, wherein the first and further quality factor model are different.

In a further development, in at least one of the process control optimization steps, the value of the quality criterion for the process run-through executed with the changed process control is (also) determined on the basis of the quality factor determined by the machine-learned further quality factor model on the basis of the value of the first process variable, which value is detected for this, in particular during this, process run-through. In one embodiment, two or more different machine learning methods or machine-learned quality factor models are thus bundled, aggregated (used) in one embodiment.

As a result, in one embodiment, the optimization, in particular a convergence, can be improved, in particular a stability can be increased, and/or a required time and/or run-through number can be reduced, and/or the practicability of the found optimum or the optimized process, in particular robot control, can be improved.

Additionally or alternatively, in one development, a message which is optical and/or acoustic in one embodiment, is output in one embodiment on the robot, for example by means of a robot-fixed lamp or the like, if a tolerance variable which is dependent on a deviation between a quality factor determined by the first quality factor model and a quality factor detected by the further quality factor model on the basis of the value of the first process variable, which value is detected for the, or during the, process run-through in one of the process control optimization steps, is outside a predetermined tolerance range. In one embodiment, it is signaled (by means of the message) that an operator intervention is required.

As a result, in one embodiment, the optimization, in particular a convergence, can be improved, in particular a stability can be increased, and/or a required time and/or run-through number can be reduced, and/or the practicability of the found optimum or the optimized process, in particular robot control, can be improved.

In one embodiment, a confidence interval of the first quality factor model is determined and a message which is optical and/or acoustic in one embodiment is output in one embodiment on the robot, for example by a robot-fixed lamp or the like, if this exceeds an, in particular predetermined, limit value. In one embodiment, it is signaled (by means of the message) that an operator intervention is required.

As a result, in one embodiment, the optimization, in particular a convergence, can be improved, in particular a stability can be increased, and/or a required time and/or run-through number can be reduced, and/or the practicability of the found optimum or the optimized process, in particular robot control, can be improved.

In one embodiment, at least one process run-through executed with one (of the) varied process control(s) in one (of the) assessment learning step(s) is assessed (in each case) on the basis of an electronically transmitted signal, in particular without a direct view of the process. The electronically transmitted signal can in particular comprise one or more recorded images of the process.

As a result, in one embodiment, the safety of an operator can be increased and/or an operator can at the same time assess or optimize a plurality of (arranged) processes, in particular processes of a plurality of distributed (arranged), robots.

In one embodiment, the first process variable and/or the second process variable comprise robot-specific, actual data and/or target data detected in one embodiment by robot-side and/or robot-external sensors, in particular at least one coordinate of a pose of at least one robot-fixed reference and/or a first and/or higher time derivative thereof, a force on at least one robot-fixed reference and/or at least one drive variable of at least one robot drive, and/or visual and/or audio and/or time data, in particular time durations.

In one embodiment, the first process variable and/or the second process variable thus comprises robot trackers or time profiles of joint coordinates and/or coordinates of end effector poses in the working space and/or of time derivatives thereof and/or of external forces acting on the robot, in particular contact forces, and/or of drive forces and/or currents and/or voltages of drives of the robot. For a more compact illustration, anti-parallel force pairs or torques are generally also referred to as forces in the present case.

Additionally or alternatively, the first process variable and/or the second process variable in one embodiment comprises visual data, in particular camera or image data, and/or audio signals or data which are determined on the basis of images, in particular camera images, and/or audio signals.

Additionally or alternatively, the first process variable and/or the second process variable in one embodiment comprises a duration of the relevant process run-through and/or one or more portions thereof.

Such process variables are, on the one hand, particularly suitable for optimizing processes and, on the other hand, can be taken into account particularly well using a machine-learned quality factor model.\

In one embodiment, assessments are detected using human inputs. For example, during and/or after a process run-through, an operator can indicate or assess the value of the quality factor for this process run-through, in one embodiment assess the success of the process run-through.

In one embodiment, the practicability of the found optimum or the optimized process, in particular robot control, can be improved as a result.

Additionally or alternatively, in one embodiment assessments are automatically detected, in one embodiment detected in a sensor-supported manner. For example, image and/or audio recognition or processing during and/or after a process run-through can indicate or assess the value of the quality factor for this process run-through, in one embodiment assess the success of the process run-through.

In one embodiment, the optimization, in particular a convergence, can thereby be improved, in particular a stability can be increased and/or a personnel outlay, a required time and/or run-through number can be reduced.

Additionally or alternatively, in one embodiment, assessments are divalent, in particular "good"/"poor", "0"/"1", "OK"/"not OK" or the like.

In one embodiment, the optimization, in particular the stability, can thereby be increased.

In another embodiment, assessments are trivalent or polyvalent, and, for example, comprise notes of a trivalent or polyvalent scale, a classification into three or more different quality grades or the like.

In one embodiment, the practicability of the found optimum or the optimized process, in particular robot control, can be improved as a result.

In one embodiment, the first quality factor model comprises a neural network, a random forest model, a decision tree model, a k-nearest neighbor model, a logistic regression model or a, in particular generalized, linear model.

Additionally or alternatively, in one embodiment, the further quality factor model comprises a neural network, a random forest model, a decision tree model, a k-nearest neighbor model, a logistic regression model or a, in particular generalized, linear model, wherein in one embodiment the first and further quality factor model are different.

These machine learning methods are particularly suitable for determining a quality factor of a, in particular robot-assisted, process.

In one embodiment, different subsequent processes are executed depending on the detected assessment of a process executed in an assessment learning step. Additionally or alternatively, different subsequent processes are executed in one embodiment depending on the determined quality factor of a process executed in a process control optimization step. For example, in the case of a (sufficiently) successful joining process, a component can be fed to a normal further process sequence and the component can be sorted or fed to a subsequent processing process when a successful joining process is not (sufficiently) successful.

In this way, in one embodiment the, in particular robot-assisted, process can be further improved.

According to one embodiment of the present invention, a system for executing a process is designed, in one embodiment using, in particular by means of, at least one robot(s), in particular using hardware and/or software, in particular using programming, to execute a method described here and/or comprises:
  means for executing a run-through of the process by means of a process control, in particular by means of a process control of the robot;
  means for detecting a value of a first process variable for this, in particular during this, execution; and
  means for detecting an assessment of this executed process run-through;
  means for repeatedly executing the assessment learning steps:
  varying the process control, in particular at least one parameter of the process control, in particular of a controller, by means of an optimizer to form a varied process control on the basis of values of a quality criterion for executed process run-throughs;
  executing a run-through of the process with the varied process control;
  detecting a value of the first process variable for this, in particular during this, execution; and
  detecting an assessment of this executed process run-through;
  wherein a first quality factor model of the process, which model determines a quality factor of the process on the basis of the first process variable, is machine-learned on the basis of these detected assessments and values of the first process variable; and
  means for repeatedly executing the process control optimization steps:
  varying the process control by means of the optimizer to form a changed process control on the basis of values of the quality criterion for executed process run-throughs;
  executing a run-through of the process with the changed process control; and
  detecting a value of the first process variable for this, in particular during this, execution;
  wherein the value of the quality criterion for at least one of the process run-throughs executed with one of the changed process controls is determined on the basis of a quality factor determined by the machine-learned first quality factor model on the basis of the value of the first process variable, which value is detected for this, in particular during this, process run-through.

In one embodiment, the system or its means comprises:
  means for determining the value of the quality criterion for at least one process run-through executed with a varied process control in an assessment learning step on the basis of the detected assessment of this process run-through; and/or
  means for detecting values of a second process variable for executing process run-throughs in assessment learning steps and/or process control optimization steps, wherein the value of the quality criterion for at least one process run-through executed with a varied process control in an assessment learning step is dependent on the value of the second process variable, which value is detected for this process run-through and from which value the detected assessment of this process run-through is independent, and/or wherein the value of the quality criterion for at least one process run-through executed with a changed process control in a process control optimization step is additionally dependent on the value of the second process variable, which value is detected for this process run-through and from which value the quality factor determined by the first quality factor model is independent; and/or
  means for—for at least one process run-through executed with a changed process control in a process control optimization step—detecting an assessment of this process run-through and, in one embodiment, comparing with a quality factor determined by the machine-learned first quality factor model on the basis of the value of the first process variable, which value is detected for this process run-through, as well as means for further machine learning the first quality factor model on the basis of this value of the first process variable and of this detected assessment and/or for outputting a message if a tolerance variable which is dependent on a deviation between the detected assessment and the determined quality factor is outside a predetermined tolerance range and/or for detecting an assessment of a further process run-through executed with a changed process control in a process control optimization step depending on the result of this comparison; and/or
  means for machine learning at least one further quality factor model of the process, which model determines a quality factor of the process on the basis of the first process variable, on the basis of assessments and values of the first process variable, which are detected for, in particular in, assessment learning step(s), wherein the first quality factor model and further quality factor models are different, and means for determining, in at least one of the process control optimization steps, the value of the quality criterion for the process run-through executed with the changed process control on the basis of the value determined by the machine-learned further quality factor model on the basis of the quality factor determined for this value of the first process variable, which value is detected for this process run-through, and/or for outputting a message, if a tolerance variable which is dependent on a deviation between a quality factor determined by the first quality factor model and by the further quality factor model on the basis of the value of the first process variable, which value is detected for the, or during the, process run-through in one of the process control optimization steps, is outside a predetermined tolerance range; and/or means for determining a confidence interval of the first quality factor model and outputting a message when said confidence interval exceeds a limit value; and/or means for assessing at least one process run-through executed with a varied process control in an assessment learning step on the basis of an electronically transmitted signal, in particular without a direct view of the process; and/or means for detecting assessments using human inputs and/or automatically, in particular in a sensor-supported manner; and/or means for executing different subsequent processes depending on the detected assessment of a process executed in an assessment learning step and/or for executing different subsequent processes depending on the determined quality factor of a process executed in a process control optimization step.

A means within the meaning of the present invention may be designed using hardware and/or software, and may comprise a data-connected or signal-connected, in particular, digital, processing unit, in particular microprocessor unit (CPU), preferably having a memory and/or bus system, and/or one or multiple programs or program modules. The CPU may be designed to process commands that are implemented as a program stored in a memory system, to detect input signals from a data bus and/or to output output signals to a data bus. The CPU can in particular have a graphic card (GPU) and/or at least one neural computing chip. A storage system may comprise one or a plurality of, in particular different, storage media, in particular optical, magnetic, solid-state, and/or other non-volatile media. The program may be designed in such a way that it embodies or is capable of executing the methods described herein, so that the CPU is able to execute the steps of such methods and thus, in particular, is able to execute the process or its optimization. In one embodiment, a computer program product may comprise—and may in particular be—an in particular non-volatile storage medium for storing a program, or having a program stored thereon, wherein the execution of this program causes a system, in particular a computer, to execute a method described herein, or one or multiple steps thereof.

In one embodiment, one or more, in particular all, steps of the method are carried out completely or partially automatically, in particular by the system or its means.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 2:
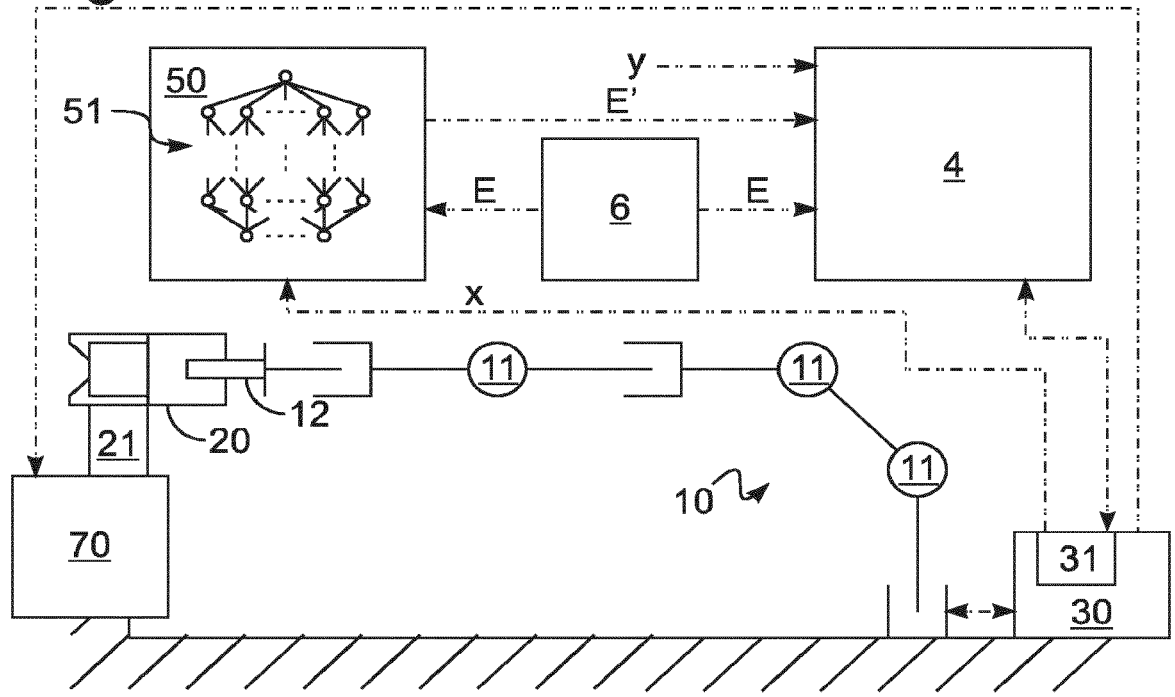
FIG. 2 shows a system for executing the method according to an embodiment of the present invention.

FIG. 2 shows a system for executing a method according to an embodiment of the present invention.

The system comprises a robot 10 having (a) joint(s) (drives) 11 which, with its end effector 12, is intended to plug in snappers 20 onto components 21 which are conveyed on a conveyor belt 70.

For this purpose, said robot is controlled by a robot controller 30 having a regulator 31, wherein regulation is also referred to as control in the present case and the regulator 31 can also have individual joint regulators for the individual joint(s) (drives) 11.

In a step S10, the plugging-in process is first executed with default values for parameters of the regulator 31. One (value of a) first process variable comprises robot trackers x, for example shaft angles and/or shaft speeds and/or forces or torques in drives and/or shafts and/or on the end effector 12, and is transmitted to a machine learning method 50, in the embodiment in an artificial neural network 51.

Furthermore, an operator (not shown) assesses this process run-through via an input device 6, for example its success. In another embodiment, it can also indicate or input a value for another quality factor. This assessment E is detected and also reported to the machine learning method 50 or artificial neural network 51 as well as an optimizer 4.

One (value of a) second process variable in the form of a process duration y is also reported to the optimizer 4.

Figure 1:
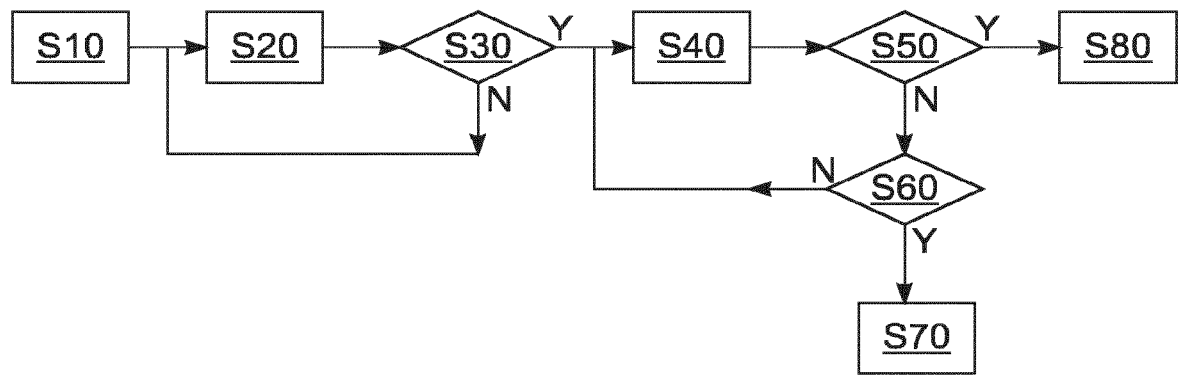
FIG. 1 shows a method for executing a process according to an embodiment of the present invention.

Subsequently, the parameters of the regulator are varied multiple times by the optimizer 4, and the process with the process control varied in this way, i.e. the regulation parameters varied in this way, is executed again (FIG. 1: step S20) as long as a termination criterion is not fulfilled (step S30: "N"), for example the neural network 51 is not yet sufficiently trained or the quality factor model implemented as a result is not yet sufficiently machine-learned.

In this case, the corresponding values x, y of the first or the second process variable as well as the assessment E are reported by the operator to the machine learning method 50 or artificial neural network 51 (x, e) or the optimizer 4 (y, e) in each of these assessment learning steps S20 which are repeated multiple times.

The optimizer 4 determines the value of a quality criterion, for example as a weighted sum of the relevant process duration y and the assessment E, and varies on the basis of this (value of the) quality criterion the parameters of the regulator; the quality factor model or artificial neural network 51 is trained or machine-learned on the basis of these assessments E and values of the first process variable x.

If the termination criterion is fulfilled (S30: "Y"), the system or method continues with the process control optimization.

Here, the parameters of the regulator are further varied by the optimizer 4, and the process with the process control varied in this way, i.e. the regulator parameters varied in this way, is executed again (step S40) until a termination criterion is fulfilled (step S50: "Y"), for example the value of the quality criterion is in a predetermined range.

In this case, the value of the quality criterion is determined in an analogous manner as a weighted sum, wherein instead of the assessment E the quality factor E' determined by the machine-learned quality factor model 51 on the basis (of the value) of the first process variable x is used.

If the termination criterion is fulfilled (step S50: "Y"), the process can be executed further with the process, in particular robot control, optimized in this way (S80), and here also it can be further optimized and/or machine-learned.

If the process control optimization is not yet finished (S50: "N"), the quality of the machine-learned quality factor model is checked at regular intervals, for example a confidence interval or a deviation from a second, different quality factor model, which is machine-learned in parallel, or an assessment E, which is still detected in one embodiment at increased time intervals and/or time intervals which are dependent on the deviation, is checked. If the confidence interval or the confidence deviation becomes too large (S60: "Y"), an operator intervention is requested or signaled (step S70), otherwise (S60: "N") the process control optimization is continued.

Depending on the detected assessment E or determined quality factor E', the controller 30 instructs the conveyor belt 70 to supply the component 21 after the joining process with a normal follow-up process or subsequent processing process.

Although embodiments have been explained in the preceding description, it is noted that a large number of modifications are possible.

Thus, in the embodiment, the neural network 51 learns only on the basis of robot-specific sensor data x. In a modification, it can additionally or alternatively also take into account other data, for example the process duration y or the like.

It is also noted that the embodiments are merely examples that are not intended to restrict the scope of protection, the applications, and the structure in any way. Rather, the preceding description provides a person skilled in the art with guidelines for implementing at least one embodiment, with various changes, in particular with regard to the function and arrangement of the described components, being able to be made without departing from the scope of protection as it arises from the claims and from these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

4 Optimizer
6 Input device
10 Robot
11 Joint (drive)
12 End effector
20 Snapper
21 Component
30 Control
31 Regulator
50 Machine learning method
51 Artificial neural network (machine-learned quality factor model)
70 Conveyor belt
E Assessment
E' Quality factor
x Robot trackers (first process variable)
y Process duration (second process variable)

What is claimed is:

1. A method for executing a process on a robot, the method comprising:
    executing a first run-through of the process with a process control;
    detecting a value of a first process variable for the executed first run-through; and
    detecting an assessment of the executed process run-through;
    repeating assessment learning steps multiple times, the assessment learning steps comprising:
        varying the process control using an optimizer to form a varied process control on the basis of values of a quality criterion obtained from previously executed process run-throughs,
        executing a second run-through of the process with the varied process control,
        detecting a value of the first process variable for the executed second run-through, and
        detecting an assessment of the executed second run-through;
    wherein a first quality factor model of the process, which model determines a quality factor of the process on the basis of the first process variable, is machine-learned on the basis of the detected assessments and values of the first process variable;
    repeating process control optimization steps multiple times, the process control optimization steps comprising:
        varying the process control using the optimizer to form a changed process control on the basis of values of the quality criterion for executed process run-throughs,
        executing a third run-through of the process with the changed process control, and
        detecting a value of the first process variable for the executed third run-through;
    wherein the value of the quality criterion for at least one of the third run-throughs executed with one of the changed process controls is determined on the basis of a quality factor determined by the machine-learned first quality factor model on the basis of the value of the first process variable, which value is detected for the third run-through; and
    in response to a termination criterion being fulfilled, controlling the robot to perform the optimized process having the changed process control.

2. The method of claim 1, wherein at least one of:
    the process is executed using at least one robot;
    the process control is a process control of at least one robot; or
    varying the process control comprises varying at least one parameter of the process control, in particular a regulator.

3. The method of claim 1, wherein the value of the quality criterion for at least one second run-through executed with a varied process control in an assessment learning step is determined on the basis of the detected assessment of the at least one second run-through.

4. The method of claim 1, further comprising at least one of:
  detecting values of a second process variable for executing process run-throughs in assessment learning steps and/or process control optimization steps;
  the value of the quality criterion for at least one second run-through executed with a varied process control in an assessment learning step is additionally dependent on a value of a second process variable, which value is detected for the at least one second process run-through and from which value the detected assessment of the at least one second process run-through is independent; or
  the value of the quality criterion for at least one third run-through executed with a changed process control in a process control optimization step is additionally dependent on a value of a second process variable, which value is detected for the at least one second run-through and from which value the quality factor determined by the first quality factor model is independent.

5. The method of claim 1, wherein, for at least one third run-through executed with a changed process control in a process control optimization step, an assessment of the at least one third run-through is detected and compared with a quality factor determined by the machine-learned first quality factor model on the basis of the value of the first process variable, which value is detected for the at least one third run-through;
  the method further comprising at least one of:
    further machine learning the first quality factor model on the basis of the value of the first process variable and the detected assessment of the at least one third run-through,
    outputting a message if a tolerance variable which is dependent on a deviation between the detected assessment and the determined quality factor is outside a predetermined tolerance range, or
    detecting an assessment of a further process run-through executed with a changed process control in a process control optimization step based on the result of the comparison.

6. The method of claim 1, further comprising:
  machine-learning at least one second quality factor model of the process on the basis of assessments and values of the first process variable that are detected for assessment learning steps, which at least one second quality factor model determines a quality factor of the process on the basis of the first process variable, wherein the first quality factor model and the at least one second quality factor model are different; and
  at least one of:
    in at least one of the process control optimization steps, determining the value of the quality criterion for the third run-through executed with the changed process control on the basis of the quality factor determined by the machine-learned at least one second quality factor model on the basis of the value of the first process variable, which value is detected for the third run-through, or
    outputting a message when a tolerance variable which is determined by a deviation between a quality factor detected by the first quality factor model and a quality factor detected by the at least one second quality factor model on the basis of the value of the first process variable, which value is detected for the process run-through in one of the process control optimization steps, is outside a predetermined tolerance range.

7. The method of claim 6, wherein the first quality factor model or the at least one second quality factor model comprises an artificial neural network, a random forest model, a decision tree model, a k-nearest neighbor model, a logistic regression model, or a linear model.

8. The method of claim 7, wherein the first quality factor model or the at least one second quality factor model comprises a generalized linear model.

9. The method of claim 1, further comprising:
  determining a confidence interval of the first quality factor model and outputting a message when the confidence interval exceeds a limit value.

10. The method of claim 1, further comprising:
  assessing at least one second run-through executed with a varied process control in an assessment learning step on the basis of an electronically transmitted signal.

11. The method of claim 10, wherein the at least one second run-though is assessed without a direct view of the process.

12. The method of claim 1, wherein at least one of the first or second process variables comprises at least one of:
  data obtained from robot-specific sensors;
  at least one of actual data or target data;
  a force on at least one robot-fixed reference and/or at least one drive variable of at least one robot drive; or
  at least one of visual data, audio data, or time data.

13. The method of claim 12, wherein at least one of:
  robot-specific sensors are at least one of robot-side sensors or robot-external sensors; or
  the actual data or target data is at least one of:
    at least one coordinate of a pose of at least one robot-fixed reference, or
    a time derivative of at least one coordinate of a pose of at least one robot-fixed reference.

14. The method of claim 1, wherein at least one of the assessments is at least one of:
  detected by human inputs;
  detected automatically, in particular in a sensor-supported manner; or
  divalent or polyvalent.

15. The method of claim 1, further comprising at least one of:
  executing different subsequent processes based on the detected assessment of a process executed in an assessment learning step; or
  executing different subsequent processes based on the determined quality factor of a process executed in a process control optimization step.

16. A computer program product comprising a program code stored on a non-transient, computer-readable medium, the program code, when executed by a computer, causing the computer to carry out the method of claim 1.

17. A system for executing a process on a robot, the system comprising:
  means for executing a first run-through of the process with a process control;
  means for detecting a value of a first process variable for the executed first run-through; and
  means for detecting an assessment of the executed first run-through;

means for repeating assessment learning steps multiple times, the assessment learning steps comprising:
varying the process control using an optimizer to form a varied process control on the basis of values of a quality criterion obtained from previously executed process run-throughs,
executing a second run-through of the process with the varied process control,
detecting a value of the first process variable for the executed second run-through, and
detecting an assessment of the executed second run-through;
wherein a first quality factor model of the process, which model determines a quality factor of the process on the basis of the first process variable, is machine-learned on the basis of the detected assessments and values of the first process variable;
means for repeating process control optimization steps multiple times, the process control optimization steps comprising:
varying the process control using the optimizer to form a changed process control on the basis of values of the quality criterion for executed process run-throughs,
executing a third run-through of the process with the changed process control, and
detecting a value of the first process variable for the executed third run-through;
wherein the value of the quality criterion for at least one of the third run-throughs executed with one of the changed process controls is determined on the basis of a quality factor determined by the machine-learned first quality factor model on the basis of the value of the first process variable, which value is detected for the third run-through; and
means for controlling the robot to perform the optimized process having the changed process control.

* * * * *